Patented Mar. 27, 1951

2,546,631

UNITED STATES PATENT OFFICE 2,546,631

COLOR STABILIZATION OF HALOGEN-CONTAINING POLYMERS

Willem Leendert Johannes de Nie and Christiaan Nicolaas Jacobus de Nooijer, Amsterdam, Netherlands, assignors to Shell Development Company, San Francisco, Calif., a corporation of Delaware No Drawing. Application August 5, 1946, Serial No. 688,416. In the Netherlands September 29, 1945

9 Claims. (Cl. 260—45.7)

This invention relates to a process for improving the color and color stability of halogen containing high molecular weight compounds. It is well known that plastic compositions of halogen containing high molecular weight compounds change color when subjected to elevated temperatures and upon long standing. It is the primary object of the present invention to provide a process for preventing this deterioration of color and also a process for restoring the original color in those situations wherein the color change has already taken place. It is a further object of this invention to improve the color and/or color stability of halogen containing plastics without adversely affecting the physical properties of such plastics.

The objects of the present invention are achieved by incorporating organic peroxides, and particularly organic hydroperoxides, in the plastic mass.

The present invention is applicable to all halogen-containing high molecular weight polymers, such as the polymers of vinyl and vinylidene halides, copolymers of such substances with one another or with other polymerizable substances and mixtures containing such compounds. As examples of such polymeric materials to which the invention is applicable may be mentioned polyvinyl chloride, polyvinyl bromide, interpolymers of vinyl chloride and vinyl acetate, chlorinated polyvinyl chloride, chlorinated rubber, brominated rubber and chloroprene polymers and copolymers. In addition, the invention is applicable to mixtures of polymerizable compounds, wherein only a portion of the mixture contains a halogenated polymerizable substance. The invention is also applicable to mixtures or copolymers of resinous materials such as those set forth above with acrylate resins such as polymerized esters of methacrylic and acrylic acids; polyvinyl acetals and the like.

The organic hydroperoxides constitute a preferred class of compounds for use as color stability agents. As examples of such compounds may be mentioned tetrahydronaphthalene hydroperoxide (tetralin hydroperoxide), tert-butyl hydroperoxide, tert-amyl hydroperoxide, propyl hydroperoxide and cyclohexyl hydroperoxide. These compounds do not leave an acid residue when they decompose to release their oxygen. A less preferred class of compounds embraces the organic di-peroxides and other peroxide-type compounds which generally leave an acid residue. The acid residue has an adverse effect on the thermal stability and electrical conductivity of the resulting plastic. Nevertheless, such compounds may be used, particularly in the case of those articles in which the highest degree of thermal stability is not required, or in which it is practical to treat the articles produced to remove any remaining acids. Suitable di-peroxides include di-tert-butyl peroxide, dibenzoyl peroxide, diacetyl peroxide, methyl-ethyl peroxide, diacetyl peroxide and di-tert-amyl peroxide. Other peroxide-type compounds include peracids such as peracetic acid (acetyl hydroperoxide) and perbenzoic acid, and per-esters such as tert-butyl perbenzoate, tert-butyl peracetate, tert-butyl perlaurate, tert-butyl perpelargonate, and tert-butyl perstearate. Any of the compounds listed above may be halogenated for use in the present invention, compounds such as the following being suitable; di-chloropropyl hydroperoxide, monobromobutyl hydroperoxide, monochlorocyclopentyl hydroperoxide, bis-dichloroamyl peroxide, and bis-dibromobutyl peroxide. All of the compounds of the types mentioned above are hereinafter referred to by the generic term "organic peroxides."

The change in color of halogenated plastics ordinarily takes place subsequent to polymerization at the time that plasticization and/or molding takes place. Ordinarily, polymerization is performed at too low a temperature to cause the color change while the plasticization and molding are done at considerably higher temperatures. For this reason, it is preferred to add the peroxide to the polymerized molding composition before it is formed into a finished article. In this way, the color change is prevented from taking place, which is ordinarily preferable to decolorizing an article which has already become discolored. The concentration of organic peroxide may vary within wide limits and from about 0.1% to about 20% (by weight calculated on total product) may be used. It is preferred to use smaller quantities of from about 0.5% to 5%. The exact quantity chosen should be sufficient to effectively prevent the change in color, but should not be large enough to leave any substantial quantity of non-decomposed peroxide in the finished product. If hydroperoxides are used, no further treatment is necessary. If organic peroxides other than the hydroperoxides are used it may be desirable to neutralize any acidic residue left by the decomposition of the peroxide. This may be done by immersing the article in a swelling agent (such as those described in detail below) followed by immersion in an alkaline bath.

The peroxide should be thoroughly mixed with the molding composition before molding. The following example illustrates one method of carrying out the invention.

Example I 200 grams of a copolymer composed of equal parts by weight of vinyl chloride and vinylidene chloride in powder form was mixed with 6 grams of a ground lead salt of woolfat acids and 3 grams of finely pulverized tetralin hydroperoxide. The mixture was milled for 6 minutes at a temperature of 100–105° C., which produced a fully transparent colorless milled sheet.

Example II

The process of Example I, was repeated with the exception that the tetralin hydroperoxide was omitted. Upon milling, a plastic sheet was formed which was discolored to a light yellow or light brown.

When one wishes to apply the present invention to the decolorizing of articles which have already been discolored, it is necessary to dissolve the organic peroxide in a swelling agent for the plastic and treat the plastic with the resulting solution. Any volatile swelling agent capable of swelling the plastic and dissolving the peroxide may be used. Suitable swelling agents include ketones such as cyclohexanone, methyl ethyl ketone, mesityl oxide, isophorone and the like; ethers such as diisopropyl ether and dioxane; chlorinated hydrocarbons such as chlorobenzene, ethylene dichloride, tetrachlorethane and chloroform; and esters such as ethyl acetate and methyl propionate.

In use, the peroxide is dissolved in the swelling agent and the plastic is placed in the solution and allowed to swell. The percentage of peroxide in the swelling agent may vary from about 0.5 to 40% by weight. Preferably from about 1 to 10% of the peroxide is used. The exact amount used depends upon the degree of discoloration of the plastic but should not be large enough to permit any substantial amount of non-decomposed peroxide to remain in the plastic after treatment is complete. The temperature of the swelling bath is not particularly important and room temperature is generally found to be satisfactory, although somewhat elevated temperatures may be used. The plastic article to be treated is left in the swelling solution until the weight of the article has increased from 10% to 25%. The article is then placed in a heated chamber which causes the evaporation of the swelling agent. The article may be removed from the heated chamber and is ready for use when the weight of the article returns to substantially normal. The time in the heated chamber will vary from 4 to 5 hours to 48 or more hours, depending on the dimensions of the article being treated and upon the temperature. The heat of the chamber may be from 40° C. to 100° C., and it is preferred to have the chamber at a temperature of from 60° C. to 80° C.

If an organic peroxide other than a hydroperoxide is used in the treatment outlined above, a trace of acid will be left in the finished article. If this is considered undesirable in the particular article produced, the acid may be neutralized by placing the article in an alkaline bath. This should be done after the article has been in the swelling bath, but before it is placed in the heated chamber. Any alkali, such as sodium or potassium hydroxide may be used, and the bath should be fairly dilute, e. g., from 0.1 normal to normal. The bath may be heated to speed up the reaction.

The residence time of the article in the swelling bath may be shortened by placing the article in the presence of the vapor of the swelling agent after a short sojourn in the swelling bath. This is preferably done at an elevated temperature with the space saturated with vapor. Contact with the vapor should continue until the desired decolorizing has been achieved. If acids are to be neutralized, the neutralization should not be done until after the exposure to the vapors.

The following examples illustrate how the present invention may be applied to articles which are already discolored:

Example III

A discolored tube was placed in a solution of 15% by weight of tetralin hydroperoxide in cyclohexanone. The tube had been made by extruding at 145° C. a copolymer compound of 94% by weight of vinylidene chloride and 6% methylacrylate and the extrusion had caused the tube to become discolored to a light brown. The solution was maintained at 30° C., and the tube was permitted to swell until the weight of the tube had increased by 20%. The tube was then placed in a chamber heated to about 80° C. and was left for 48 hours. The tube was supported in the chamber in such a way that tensions on the tube were avoided. After 48 hours it was found that the tube was reduced in weight so that it weighed only 3 or 4% more than it had before the treatment was started. After this treatment, the tube was entirely colorless and transparent and was ready for use.

Example IV

A brown discolored foil having a thickness of about 1 mm, made of polyvinyl chloride was immersed in a solution of 10% by weight of dibenzoyl peroxide in tetrachlorethane. The solution was maintained at 40° C. and the residence time of the foil in the solution was such that it increased in weight about 25%. After passing through the solution, the foil was led into a chamber heated to 100° C. and which was saturated with vapors of tetrachloroethane. After ten minutes in the chamber the foil was entirely colorless and the colorless foil was immersed in a trough filled with 0.1 normal sodium hydroxide solution at a temperature of 45° C. After a contact time of one hour, it was no longer possible to detect any product derived from dibenzoyl peroxide in the foil. The foil was then washed with water and led to a drying chamber which was heated to 50° C. After 24 hours in the drying chamber, the weight of the foil was reduced so that it was only 1 or 2% greater than before treatment was started. The foil was then ready for use as a covering material.

As is shown in Example IV, the process of the present invention may be carried out in a continuous manner when it is applied to sheets, foils, threads or filaments.

We claim as or invention:

1. A process for producing a colorless color-stable thermoplastic resin from a composition consisting essentially of a solid preformed thermoplastic polymer of vinyl chloride, which consists of mixing the said preformed polymer with 0.5% to 5% by weight of tetrahydronaphthalene hydroperoxide and milling the resulting mixture at a temperature between 100° C. and 105° C. and not more than six minutes.

2. A process for producing a colorless color-stable thermoplastic resin from a composition consisting essentially of a solid preformed thermoplastic polymer of vinyl chloride, which consists of mixing the said preformed polymer with 0.1% to 20% by weight of tetrahydronaphthalene hydroperoxide and subjecting the resulting mixture to a milling operation at a temperature above 100° C., the heat employed in the said milling operation being insufficient to convert the composition into a non-thermoplastic product.

3. A process for producing a colorless color-stable thermoplastic resin from a composition consisting essentially of a solid preformed high molecular weight thermoplastic halogen-containing polymer of the group consisting of polymers of vinyl halides, polymers of the vinylidene halides, chlorinated polyvinyl chloride, chlorinated rubber, brominated rubber and chloroprene polymers, which consists of mixing the said preformed polymer with 0.5% to 5% by weight of tetrahydronaphthalene hydroperoxide and subjecting the resulting mixture to a milling operation at a temperature above about 100° C., the heat employed in the said milling operation being insufficient to convert the composition into a non-thermoplastic product.

4. A process for producing a colorless color-stable thermoplastic resin from a composition consisting essentially of a solid preformed thermoplastic polymer of vinyl chloride, which consists of mixing the said preformed polymer with 0.1% to 20% by weight of an organic hydroperoxide and subjecting the resulting mixture to a milling operation at a temperature above 100° C., the heat employed in the said milling operation being insufficient to convert the composition into a non-thermoplastic product.

5. A process for producing a colorless color-stable thermoplastic resin from a composition consisting essentially of a solid preformed high molecular weight thermoplastic halogen-containing polymer of the group consisting of polymers of vinyl halides, polymers of the vinylidene halides, chlorinated polyvinyl chloride, chlorinated rubber, brominated rubber and chloroprene polymers, which consists of mixing the said polymer with 0.1% to 20% by weight of an organic hydroperoxide and subjecting the resulting mixture to a milling operation at a temperature above 100° C., the heat employed in the said milling operation being insufficient to convert the composition into a non-thermoplastic product.

6. In a process for producing a colorless color-stable thermoplastic resin from a composition consisting essentially of a solid preformed high molecular weight thermoplastic halogen-containing polymer of the group consisting of polymers of vinyl halides, polymers of the vinylidene halides, chlorinated polyvinyl chloride, chlorinated rubber, brominated rubber and cloroprene polymers, the improvement which comprises mixing the said polymer with 0.1% to 20% by weight of an organic hydroperoxide before subjecting the said polymer to the milling operation, and during the said milling operation maintaining the heat below that required to convert the composition into a non-thermoplastic product.

7. In a process for producing a colorless color-stable thermoplastic resin from a preformed thermoplastic copolymer of vinyl chloride and vinylidene chloride wherein the said copolymer is subjected to a milling operation, the improvement which comprises mixing a composition consisting essentially of the said solid thermoplastic copolymer of vinyl chloride and vinylidene chloride with 0.5% to 5% by weight of an organic hydroperoxide before subjecting the said copolymer to the milling operation, and during the said milling operation maintaining the temperature below that required to convert the composition into a non-thermoplastic product.

8. In a process for producing a colorless color-stable thermoplastic resin from a preformed thermoplastic polymer of a vinyl halide wherein the said polymer is subjected to a milling operation, the improvement which comprises mixing a composition consisting essentially of the said solid preformed thermoplastic polymer of a vinyl halide with 0.1% to 20% by weight of an organic hydroperoxide before subjecting the said polymer to the milling operation, and during the said milling operation maintaining the heat below that required to convert the composition into a non-thermoplastic product.

9. In a process for producing a colorless color-stable thermoplastic resin from a preformed thermoplastic polymer of a vinylidene halide wherein the said polymer is subjected to a milling operation, the improvement which comprises mixing a composition consisting essentally of the said solid preformed thermoplastic polymer of a vinylidene halide with 0.1% to 20% by weight of an organic hydroperoxide before subjecting the said polymer to the milling operation, and during the said milling operation maintaining the heat below that required to convert the composition into a non-thermoplastic product.

WILLEM LEENDERT JOHANNES DE NIE.
CHRISTIAAN NICOLAAS JACOBUS DE NOOIJER.

REFERENCES CITED

The following references are of record in the file of this patent:

UNITED STATES PATENTS

| Number | Name | Date |
|---|---|---|
| 2,068,424 | Mark | Jan. 19, 1937 |
| 2,155,590 | Garvey | Apr. 25, 1939 |
| 2,277,504 | Wiley | Mar. 24, 1942 |
| 2,366,306 | Alexander et al. | Jan. 2, 1945 |
| 2,388,319 | Fuller | Nov. 6, 1945 |
| 2,400,041 | Dickey | May 7, 1946 |
| 2,438,480 | Stanton | Mar. 23, 1948 |
| 2,448,585 | Fuller | Sept. 7, 1948 |

FOREIGN PATENTS

| Number | Country | Date |
|---|---|---|
| 510,961 | Great Britain | Aug. 10, 1939 |

OTHER REFERENCES

Medwedew et al., Acta Physicochemia U. R. S. S., vol. 11, No. 5, pp. 751–766 (1939).

Mast et al., Ind. and Engr. Chem., vol. 36, pp. 1022–1035 (1944).